July 3, 1934.  F. F. WAECHTER  1,965,397
TROLLEY BUCKET
Filed July 30, 1930   4 Sheets-Sheet 1
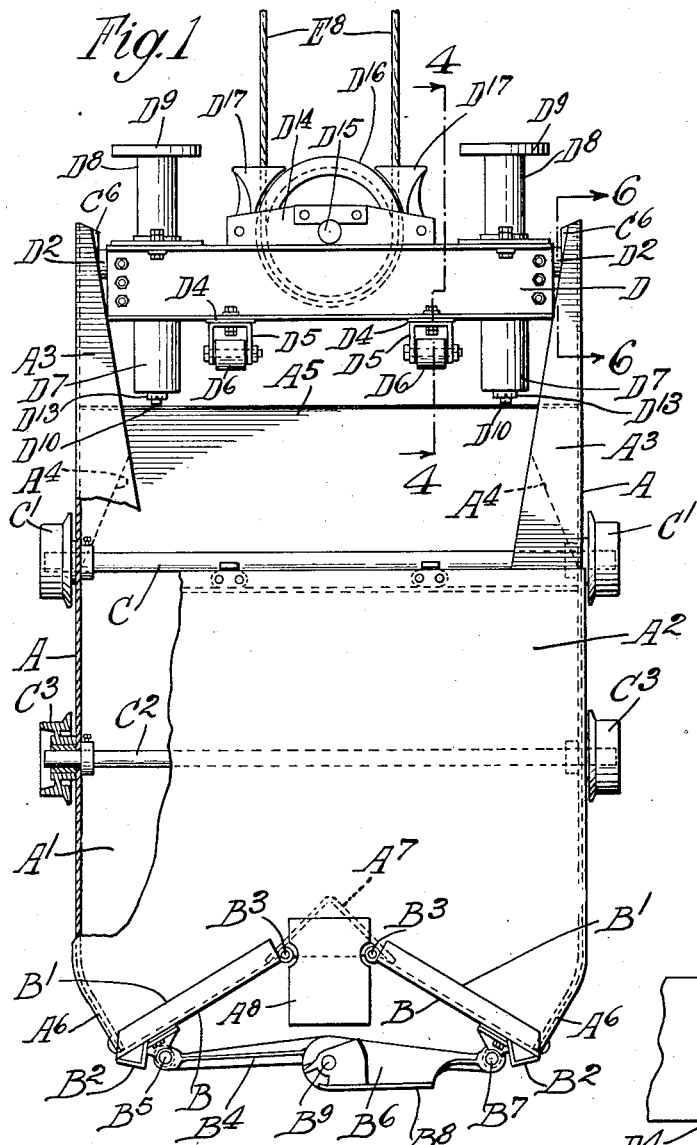
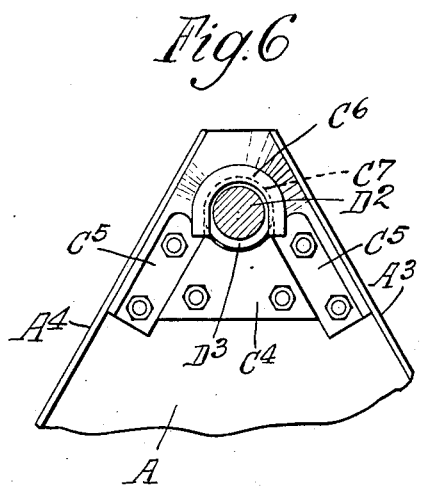
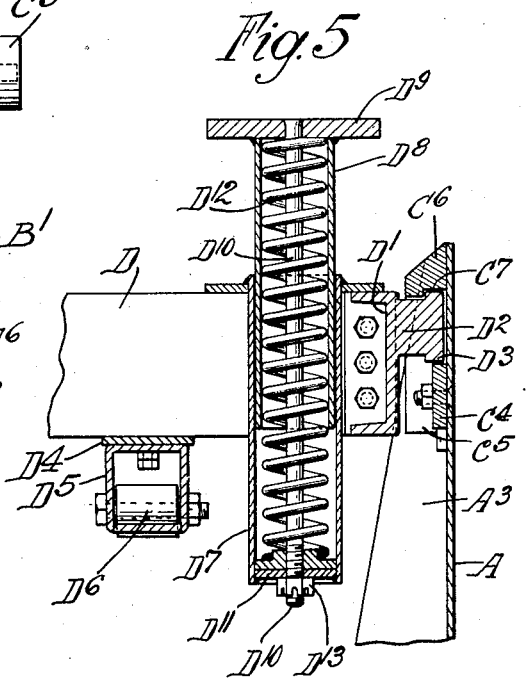
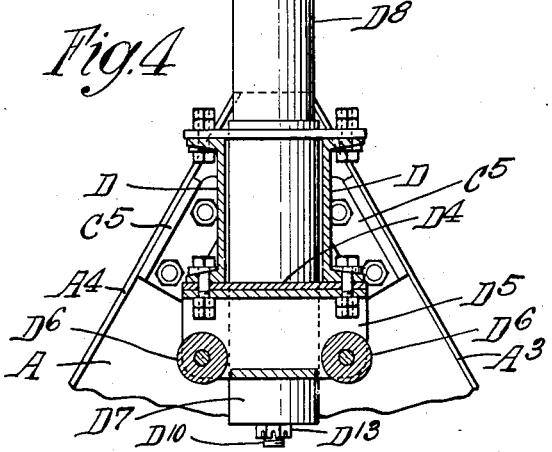
Inventor
Ferdinand F. Waechter
by Parker + Carter.
Attorneys.

July 3, 1934.  F. F. WAECHTER  1,965,397
TROLLEY BUCKET
Filed July 30, 1930  4 Sheets-Sheet 2
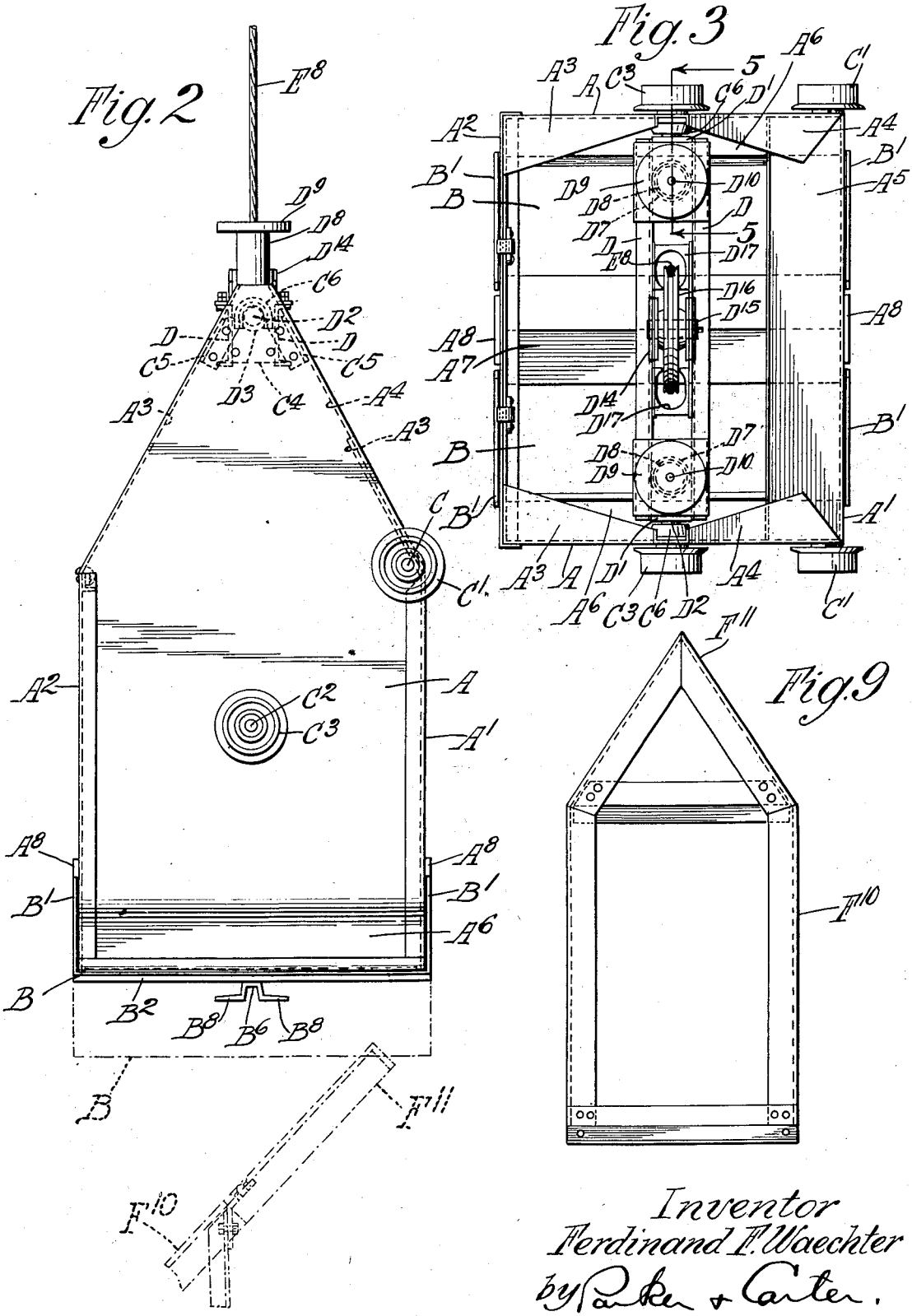
Inventor
Ferdinand F. Waechter
by Parker & Carter
Attorneys.

July 3, 1934.  F. F. WAECHTER  1,965,397
TROLLEY BUCKET
Filed July 30, 1930   4 Sheets-Sheet 3
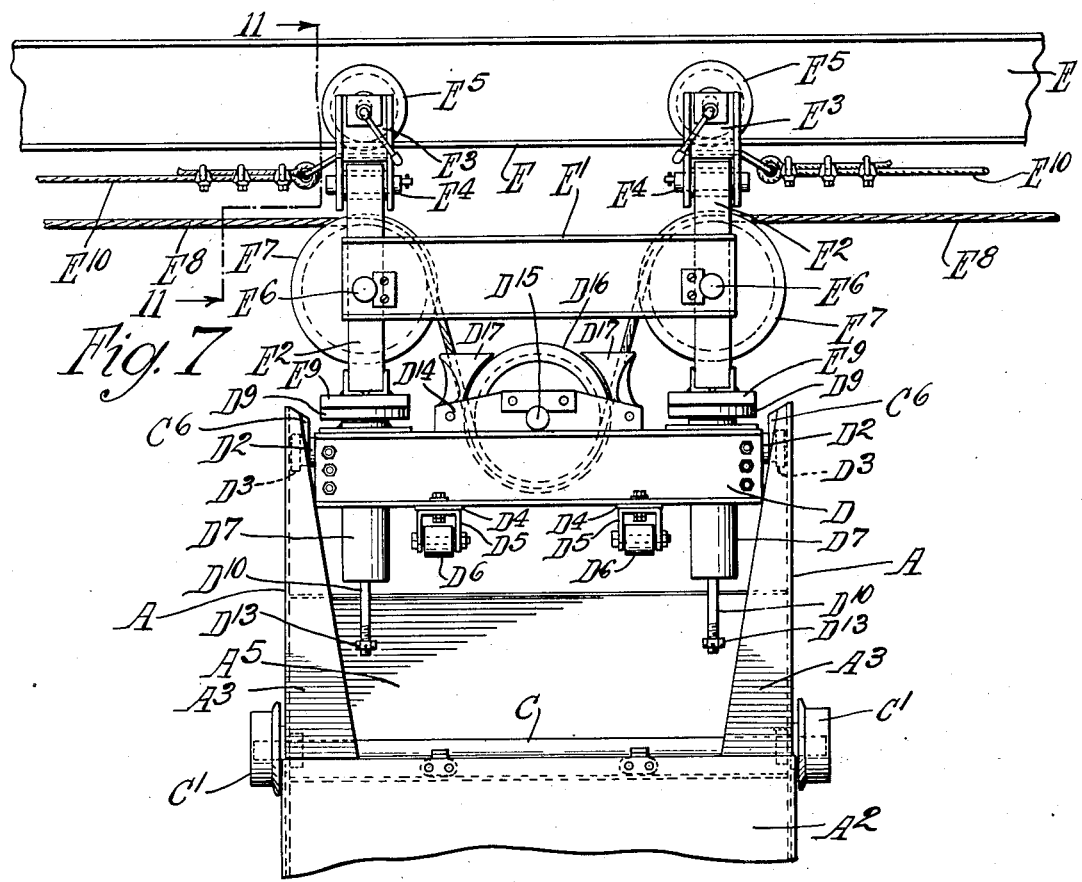
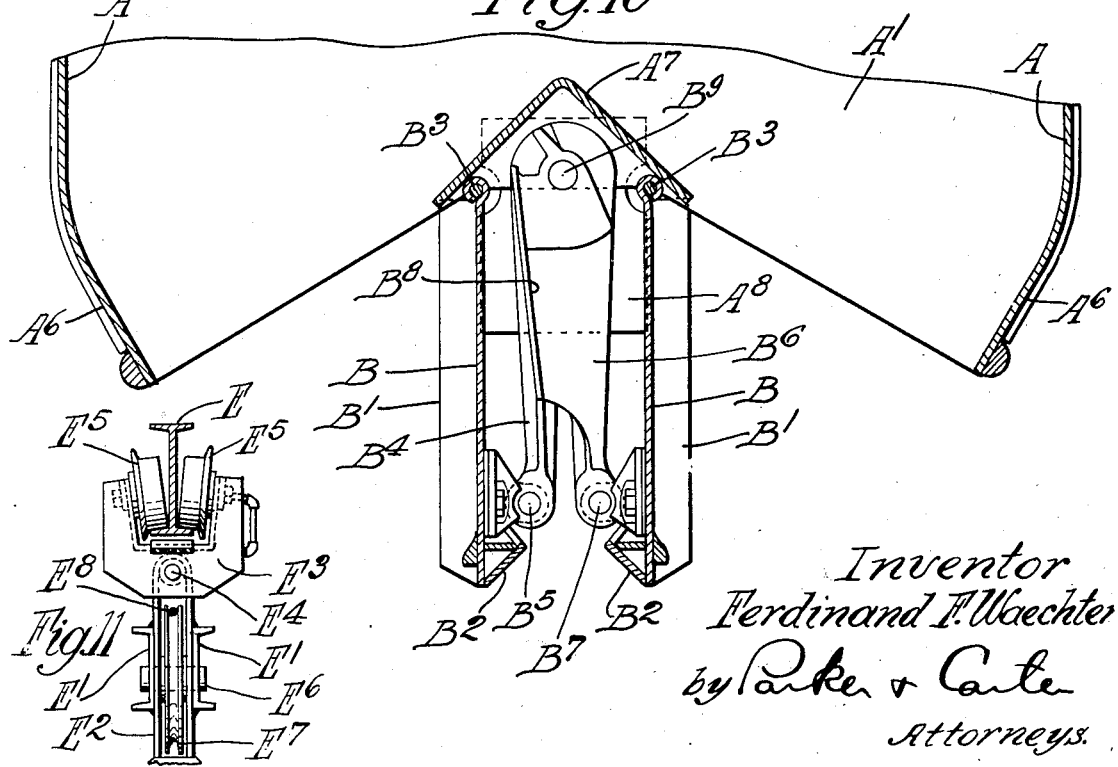
Inventor
Ferdinand F. Waechter
by Parker & Carter
Attorneys.

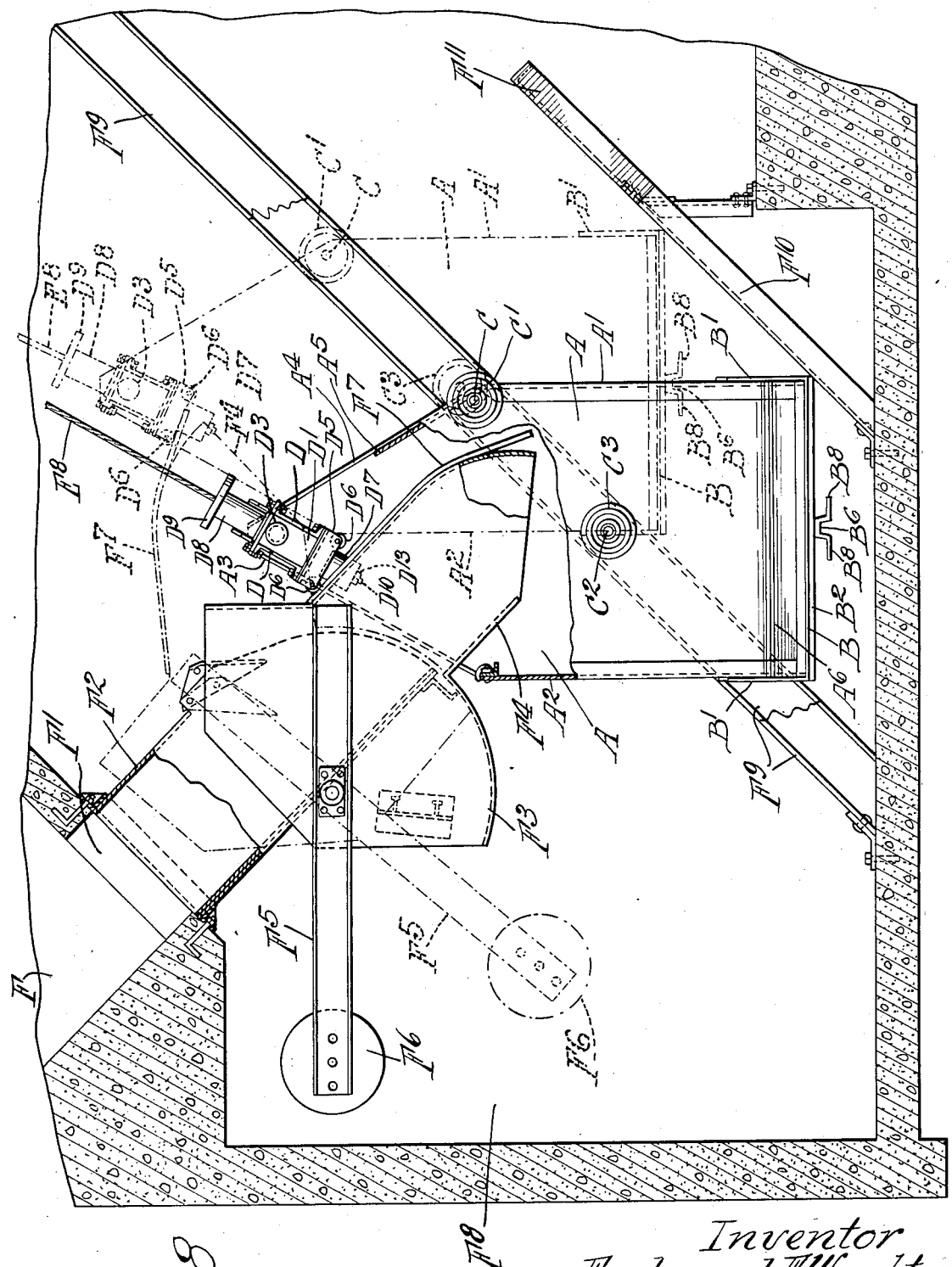

Patented July 3, 1934

1,965,397

UNITED STATES PATENT OFFICE 1,965,397

TROLLEY BUCKET

Ferdinand F. Waechter, Philadelphia, Pa., assignor to Link-Belt Company, Chicago, Ill., a corporation of Illinois Application July 30, 1930, Serial No. 471,623

6 Claims. (Cl. 294—71)

This invention relates to a hoisting bucket. In one form such a bucket is used in connection with a trolley or trolley carriage which may move along a track. The bucket itself may move with the trolley carriage or may be raised and lowered to or from the trolley carriage to move independently of it and when so moving the bucket may move along a track or path either vertical to or inclined to the trolley carriage track. I have used the expression trolley or trolley carriage to designate a carrying element, preferably wheeled, which is adapted to move longitudinally and from which the bucket is suspended. The invention is, of course, not limited to any particular type of trolley or trolley carriage or carriage.

One object of the invention is to provide a bucket mounting whereby swinging of the bucket with relation to the trolley carriage is prevented. Another object is to provide means for cushioning any shock which might occur when the bucket and trolley carriage are drawn together as in the hoisting of the bucket. Another object is to provide a bucket in which the sheave is mounted directly on the bucket without the necessity of any bail. Other objects will appear from time to time in the specification and claims.

My invention is illustrated more or less diagrammatically in the accompanying drawings, wherein—

Figure 1 is a front elevation of the bucket with parts broken away and parts in section;

Figure 2 is a side elevation of the same bucket;

Figure 3 is a plan view;

Figure 4 is a detailed vertical cross section on an enlarged scale, taken at line 4—4 of Figure 1;

Figure 5 is a detailed vertical cross section on an enlarged scale, taken at line 5—5 of Figure 3;

Figure 6 is a transverse vertical cross section on an enlarged scale, taken at line 6—6 of Figure 1;

Figure 7 is a front elevation of the bucket, showing it in position in contact with a trolley;

Figure 8 is a side elevation with parts broken away and parts in section, showing the bucket in loading position adjacent a loader;

Figure 9 is a plan view illustrating the door operating cam of the bucket;

Figure 10 is a vertical cross sectional detail showing the bucket door in the open position.

Figure 11 is a fragmentary section taken on line 11—11 of Figure 7.

Like parts are designated by like characters throughout the specification and drawings.

The bucket may be generally rectangular in cross section. It is formed of side members A, A and front and back members $A^1$, $A^2$. The members A taper at the top as indicated particularly in Figure 2, and are provided with flared extension $A^3$, $A^4$ which are joined to the members $A^1$, $A^2$, at their lower ends or edges. The side $A^1$ extends upwardly beyond the side $A^2$ and has its upper end, as at $A^5$, inwardly bent and lying generally in the plane of the edges of the side members A. Adjacent their lower edges the side members A, A may be inwardly bent as indicated in Figure 10, as at $A^5$, $A^6$. The bottom edges of the front and back members $A^1$ and $A^2$ are cut upwardly from their edges, as indicated particularly in Figures 1 and 10. Extending transversely through the bucket is a generally V-shaped partition $A^7$. It lies adjacent the bottom of the bucket and beneath and within it the doors of the bucket are mounted. $A^8$, $A^9$ are plate members positioned on the sides $A^1$ and $A^2$ and extending partially below them but not below their extreme outer bottom edges. B, B, are doors provided preferably with reinforcing side rims or flanges $B^1$ and having reinforcing members $B^2$ along their outer edges. Each of the doors is pivoted as at $B^3$ beneath the member $A^7$. The doors are connected to each other by one or more pairs of toggles. One pair is shown but more might be used. $B^4$ is one toggle arm pivoted to a door B as at $B^5$. $B^6$ is another toggle arm pivoted to the opposite door B as at $B^7$. It is provided with laterally extending webs or flanges $B^8$, $B^8$. The toggle arms are pivoted together as at $B^9$ and their contacting parts are so shaped that when the doors are in the closed position as shown in Figure 1, the pivot point $B^9$ is below the pivot points $B^5$ and $B^7$. Thus pressure from within the buckets or the doors $B^1$ cannot break the toggle and the doors are thus held closed until the toggle is moved upwardly so that the pivot point $B^9$ is moved above the points $B^5$ and $B^7$.

Extending across the bucket and journaled within it is a shaft C, carrying flanged wheels $C^1$, $C^1$. $C^2$ is a second shaft extending across and journaled within the bucket and carrying flanged wheels $C^3$, $C^3$. It is preferably lower and nearer the center of the bucket than is the shaft C. Fastened on the inner side of each of the members A and facing inwardly is a bearing supporting plate $C^4$. Adjacent it are inclined side members $C^5$ and a semi-cylindrical upper member $C^6$ which is under-cut as at $C^7$ to provide a bearing and attachment for the sheave carrying member in a manner which will be described below.

Extending transversely across the bucket and swivelled in the members $C^6$ at the top of the sides A of the bucket, is a hanger or sheave carrying member. It is preferably made up of two channel members D, D. These may be joined at their ends by plates $D^1$ which have outwardly extending from them trunnions $D^2$ which are enlarged or flanged as at $D^3$, to engage the member $C^6$ and the under-cut portion $C^7$ of that member. Extending transversely between the members D, D, may be one or more joining plates $D^4$ to which are attached roller carrying members $D^5$. Preferably at each end of each member $D^5$ is positioned a roller $D^6$ and the member $D^5$ is cut away as indicated particularly in Figure 4 to provide clearance for the roller. One or more cushioning buffers may be positioned upon the hanger and preferably between the members D, D, as indicated generally in Figure 1 and in detail in Figure 5. These buffers may consist of cylinders $D^7$ which are fixed in position, and cylinders $D^8$ which lie within and may reciprocate within the cylinders $D^7$. At their tops the cylinders $D^8$ carry contacting buffer members $D^9$. $D^{10}$ is a rod fastened at one end preferably to the member $D^9$ and extending through the two cylinders and projecting outwardly beneath the bottom of the cylinder $D^7$. This cylinder is closed by a member $D^{11}$ and a compression spring $D^{12}$ is positioned within the cylinders and about the rod $D^{10}$. It bears at one end upon the member $D^9$ and at the other upon the member $D^{11}$. A nut $D^{13}$ is threaded on the rod $D^{10}$ and it may be adjusted to adjust the compression on the spring $D^{12}$. Positioned on the hanger and preferably extending between the members D, D, is a sheave support $D^{14}$ in which a shaft $D^{15}$ is positioned. A sheave $D^{16}$ is mounted upon the shaft. The member $D^{14}$ is provided with enlarged or flared portions $D^{17}$ through which a cable may pass to pass about the sheave $D^{16}$.

E is a track formed preferably of an I-member upon which a trolley is positioned and along which it may move. The trolley preferably consists of a frame formed of two channels $E^1$ from which members $E^2$ extend upwardly. Upon these members, adjacent their upper ends, laterally extending frame members $E^3$ are pivoted as at $E^4$. Each of the frame members $E^3$ preferably carries a pair of flanged rollers $E^5$ which are positioned to run upon the lower flange of the track member E. Carried upon shafts $E^6$ which are positioned in the trolley frame and preferably between the members $E^1$, are sheaves $E^7$ about which a hoisting rope $E^8$ may run. This hoisting rope also is positioned about the sheave $D^{16}$ of the bucket. At their lower ends, the frame members $E^2$ have positioned upon them laterally extended buffer members $E^9$ which may be contacted by the buffer members $D^9$ of the bucket. When the bucket is hoisted, the buffers $D^9$ contact the buffers $E^9$ compressing the springs $D^{12}$ and extending the rods $D^{10}$ through the bottom of the cylinders $D^7$. This position is indicated in Figure 7. $E^{10}$ is a trolley rope fastened to the trolley in any suitable manner. By means of this rope the trolley may be moved along the track E.

Figure 8 illustrates the bucket in loading position in which it is in position to receive a charge of material. F is a storage bin provided with an outlet $F^1$ which communicates with a fixed chute $F^2$ upon which is pivoted a loading chute and gate assembly $F^3$. The details of this will not be described fully as they form no particular part of the present invention. The bucket may be used in connection with many different types of gates and may be loaded or filled by many different means and even by hand. Its novelty is not limited in connection with any particular loading means or process. The loader $F^3$ carries a final discharge chute $F^4$ which is adapted to be engaged by and to extend into the bucket. An arm $F^5$ extends rearwardly of the chute and carries a counterweight $F^6$. Ordinarily the counterweight holds the chute in the upper or closed position when it is free to do so. In the form of loader here shown, the member $F^4$ carries one or more yielding contact members $F^7$ which, in the form here shown, are springs. They are contacted by the rollers $D^6$ as the bucket descends to the loading position. The full line showing in Figure 8 indicates the bucket in the extreme downward position. The position of first contact between the bucket and the loader is indicated in dotted lines. Beneath the bin F is an excavation or cavity $F^8$ within which the loader assembly is positioned and into which the bucket moves. An inclined track $F^9$ extends into the cavity $F^8$ and engages the flanged wheels $C'$ and $C^3$ of the bucket. Fixed in the bottom of the cavity $F^8$ and preferably parallel with the track $F^9$ is a bucket door closing cam $F^{10}$. This cam is shown in elevation in Figure 8 and in plan in Figure 9. It is formed generally rectangular in plan and is provided with a pointed end $F^{11}$.

It will be realized that whereas I have herewith shown and described a practical operative device, nevertheless many changes might be made in the size, shape, number and disposition of parts without departing materially from the spirit of my invention and I wish, therefore, that my showing be taken as in a sense diagrammatic. In particular, the type of trolley or carriage or trolley carriage might be almost infinitely varied. While I have shown the bucket as being lowered along an inclined path, this is not an essential part of the invention and the bucket might be lowered vertically or along a path which is part vertical and part inclined. The final movement to the loading position might be vertical or inclined. Thus the invention is not limited to any particular position of loading or movement or to any particular track contour.

The use and operation of my invention are as follows:

Assuming that the bucket has been emptied and is to be loaded, it is lowered by the hoisting cable or rope toward the position shown in Figure 8. The doors in the bottom of the bucket are open as indicated in detail in Figure 10. As the bucket is moved into the cavity beneath the bin, the pointed nose of the door closing cam lies on a line which passes between the lower edges of the open doors. As the bucket is moved further beneath the bin, the doors or gates contact the edges of the cam and as the movement continues, since the initial contacting face of the cam is formed by the two sides of the pointed portion of the cam, the doors are spread apart and progressively moved toward the closed position until they have moved sufficiently to permit the toggle to swing downwardly and into the locking position indicated in Figure 1. The toggle and doors reach this position before the bucket has been moved sufficiently beneath the bin to commence loading. The toggle is by that time in position so that it locks the doors closed. After the bucket has been loaded, it is raised by the hoisting cable or rope and may be raised to contact with the trolley as indicated in Figure 7, and moved to any suitable dumping point. When the bucket is to be dumped, it is moved so that the toggle which holds the door closed either contacts or engages the top of a pile or any other stop and the toggle is thus broken and the bucket is then raised. Since the toggle has been broken, the doors automatically swing downwardly and material within the bucket flows out as the bucket is raised. The doors remain in the open position until the bucket is again lowered to the loading point where they strike the cam and are pushed closed.

It will be noted that the plow or cam F¹ as it penetrates between the two doors causes them to swing toward the closed position, but because of the relative arrangement of cam and bucket as shown especially in Figure 2, the plow is unable to entirely close the doors. It can swing them toward the closed position but the doors when they finally close are raised above and are altogether out of contact with the plow because what happens is that the plow spreads the doors far enough apart so that the weighted toggle has a sufficient mechanical advantage to itself by its own weight alone, close the doors and hold them closed. An arrangement such as this is possible only when the pivot axis of the doors is located in the same plane as the plane in which the bucket is traveling at the time the doors are about to be closed because only so can the plow pass between the doors freely without interfering with the passage of the bucket toward the filling position.

I claim:

1. In combination in a bucket having an open bottom, a gate movably mounted adjacent the bottom for closing it, and a toggle adapted to hold said gate closed, said toggle positioned upon the gate and constituting in itself a counterweight, whereby when the gate has been partially closed, and when it is free to do so, the toggle of its own weight moves the gate to close it, the toggle being shaped to hold the gate closed after it has once been moved to the closing position, the toggle when in the closing position extending below the lower margin of the gate.

2. In combination in a bucket having an open bottom, a gate movably mounted adjacent the bottom for closing it, and a toggle adapted to hold said gate closed, said toggle positioned upon the gate and exceeding in weight that of the gate, whereby when the gate has been partially closed, and when it is free to do so, the toggle of its own weight moves the gate to close it, the toggle being shaped to hold the gate closed after it has once been moved to the closing position, the toggle when in the closing position extending below the lower margin of the gate.

3. In combination in a bucket having an open bottom, a gate movably mounted adjacent the bottom for closing it, and a toggle adapted to hold said gate closed, said toggle pivotally positioned upon the gate and constituting in itself a counterweight, exceeding in weight that of the gate, whereby when the gate has been partially closed, and when it is free to do so, the toggle of its own weight moves the gate to close it, the toggle being shaped to hold the gate closed after it has once been moved to the closing position, the toggle when in the closing position extending below the lower margin of the gate.

4. In combination with a bucket having an open bottom, a pair of gates movably mounted on the bucket for closing the bottom, and a toggle engaging the two gates and adapted in one position to hold them closed, the toggle constituting a counterweight of sufficient weight to overcome the weight of the gates after the gates have been partially closed, whereby when free to do so the toggle swings and closes the gates, the toggle when in the closing position extending below the lower margin of the gates.

5. In combination, a bucket provided with a plurality of openings and a gate for each of said openings, and a toggle pivoted to each of said gates, the gates when opened enclosing said toggle, the toggle shaped when in one position to lock the gates closed and being of sufficient weight to overcome of itself the weight of the gates after the gates have been partially closed, and when free to do so, to move them to the closing position, the toggle when in the closing position extending below the lower margin of the gates.

6. In combination a bucket provided with a plurality of symmetrically arranged openings and an identical gate for each of said openings, and a toggle pivoted to each of said gates, the gates when opened enclosing said toggle, the toggle shaped when in one position to lock the gates closed and being of sufficient weight to overcome of itself the weight of the gates after the gates have been partially closed, and when free to do so, to move them to the closing position, the toggle when in the closing position extending below the lower margin of the gates.

FERDINAND F. WAECHTER.